United States Patent [19]

Hansen

[11] Patent Number: 4,776,016
[45] Date of Patent: Oct. 4, 1988

[54] VOICE CONTROL SYSTEM

[75] Inventor: Per K. Hansen, Burlington, Vt.

[73] Assignee: Position Orientation Systems, Inc., Burlington, Vt.

[21] Appl. No.: 800,324

[22] Filed: Nov. 21, 1985

[51] Int. Cl.[4] .............................................. G10L 1/00
[52] U.S. Cl. ...................................... 381/42; 381/43; 381/51; 381/110; 364/513.5
[58] Field of Search ...................... 381/41, 42, 43, 44, 381/45, 51, 52, 110; 364/513.5

[56] References Cited

U.S. PATENT DOCUMENTS

| | | | |
|---|---|---|---|
| 4,567,606 | 1/1986 | Vensko et al. | 381/43 |
| 4,627,001 | 12/1986 | Stapleford et al. | 364/513.5 |
| 4,677,569 | 6/1987 | Nakano et al. | 381/43 |

Primary Examiner—Peter S. Wong
Attorney, Agent, or Firm—Sherman and Shalloway

[57] ABSTRACT

The present invention relates to an improved voice control system which is designed to be adaptable to existing computers so that the existing computers may be operated through the use of voice commands. In the preferred embodiment, the present invention is connected into the existing keyboard control means and the computer itself with the system including a priority switch controlled by software giving the keyboard priority over voice entries so that the keyboard may still be used even with the present invention connected into the circuit. In the preferred embodiment, voice commands are utilized so that the existing hardware with existing software incorporated therewith may be effectively operated in a foolproof manner. The present invention uses existing voice recognition chip technology and existing speech synthesizer chip technology in a new and unique way.

13 Claims, 11 Drawing Sheets

FLOPPY DISK

ALL THESE FILES ARE STORED ON THE VCS DISKETTE (PROGRAM NAME) TRAINING  200
TRAINING PROGRAM FOR EACH SOFTWARE PACKAGE THE VCS CAN BE USED WITH. PRE-PROGRAMMED. USED ONLY IN THE HOST COMPUTER.

(PROGRAM NAME) COMMAND  201
COMMAND PROGRAM FOR EACH SOFTWARE PACKAGE THE VCS CAN BE USED WITH (AS KEYPRESSES). PRE-PROGRAMMED. USED ONLY IN VCS RAM MEMORY.

HOST COMPUTER RAM MEMORY

(PROGRAM NAME) TRAINING  200
ONLY HERE WHEN THE VCS IS IN TRAINING MODE- OPTIONAL. ONLY USED IF THE USER WANTS TO.

(PROGRAM NAME) TEMPLATE  201
ONLY HERE ON THE WAY FROM VCS RAM MEMORY TO FLOPPY DISK OR ON THE WAY FROM FLOPPY DISK TO VCS RAM MEMORY. THIS IS ONLY IN THE END OF THE TRAINING MODE OR IN THE SET-UP OF THE APPLICATION MODE.

(PROGRAM NAME) COMMAND

VCS ROM MEMORY

CONTROL PROGRAM STORED IN THE VCS ROM MEMORY

CURSOR CONTROL PROGRAM  300
KEEPS TRACK OF THE CURSOR POSITION; READS THE NEW POSITION AND MOVES THE CURSOR ACCORDINGLY.

READING OF FUNCTION KEYS AS TO SET VCS IN STANDBY MODE, GET VCS IN ON MODE, TRAINING MODE, OR APPLICATION MODE.  301

LOADING OF A PROGRAM FROM THE VCS FLOPPY DISK TO HOST COMPUTER MEMORY AND BACK  302

VCS RAM MEMORY

(PROGRAM NAME) TEMPLATE  203
THIS FILE IS CREATED IF THE USER TRAINS THE COMMANDS FOR A SOFT- WARE PACKAGE. THEN IT IS STORED ON THE VCS DISKETTE BUT ONLY USED HERE WHEN VCS IS IN THE APPLICATION MODE.

(PROGRAM NAME) GROUP TEMPLATE  202
THIS FILE IS LOADED DOWN HERE WHEN THE VCS IS IN THE APPLICATION MODE AND THE USER HAS CHOSEN NOT TO TRAIN THE COMMANDS FOR A SOFTWARE PACKAGE.

| FUNCTION KEY | PROGRAM |
|---|---|
| #1 | ON/OFF TRAINING |
| #2 | MSDOS |
| #3 | VISICALC |
| #4 | LOTUS 1,2,3 |
| #5 | SYMPHONY |
| #6 | DBASE II |
| #7 | PAINT BRUSH |
| #8 | - - |
| #9 | - - |
| #10 | TEST |

VOICE CONTROL SYSTEM

BACKGROUND OF THE INVENTION

The present invention relates to an improved voice control system. In the prior art, systems are known which incorporate therewith voice recognition and speech synthesizer chip technology. However, to Applicant's knowledge, none of the prior art, taken either alone or in combination teaches a system which utilizes such technology in the manner contemplated by applicant. The following prior art is known to applicant:

U.S. Pat. No. 3,928,724 to Byrum, et al. discloses a voice actuated telephone directory assistance system designed to interface with the telephone wherein the user spells the name letter by letter that the user wishes to call and a voice recognition device connected with a computer recognizes the name of the person as spelled out, finds the number and audibly gives it to the user. This system is significantly different from the teachings of the present invention for many reasons including the fact that patented system does not interface between a keyboard and the computer itself, the patented system does not include a way to be preprogrammed for commands which would be utilized to operate existing software packages, the patented system does not work with storage and down loading from the existing computer's diskette to RAM storage, the patented system does not have routines in a ROM memory in order to select program commands and so as to interface with the computer via the keyboard input port and down load program from diskette to RAM memory via the keyboard port, the system requires the user to spell a name one letter at a time whereas the present invention acts to respond to spoken words, and also, the patented system does not have any ability to be "trained" to respond to entire words.

U.S. Pat. No. 4,292,470 to An discloses an audio signal recognition computer which includes a mode wherein the system is trained to recognize the voice of the user. The system includes a switching device which switches the system between the training circuit for a recognizer circuit wherein data which has been trained into the device can be recognized thereby. This system is significantly different from the present invention because the present invention is not a voice recognition system per se, but rather is a system which is electrically connected between a computer and the associated keyboard so as to provide the option of using voice commands combined with keyboard input for specific programs while retaining the option of utilizing the keyboard directly. While the present invention may utilize the electronics of this patent, the present invention uses them in a vastly different and improved way.

U.S. Pat. No. 4,388,495 to Hitchcock discloses a speech recognition microcomputer which is designated to be independent of a particular user and which identifies vowel-like fricative-like and silence signal states within a word or phrase so as to recognize a preprogrammed vocabulary. This invention utilizes templates defining the limited vocabulary with which the device may be operated with the limited vocabulary stored in the microcomputer memory. This system, while slightly improving upon the teachings of An as described hereinabove, is still significantly different from the present invention for the same reasons as set forth above regarding An. Further, it is noted that the present invention is distinct from this patent because the words which are programmed into the system in accordance with the present invention are specifically chosen so as to comprise commands to operate existing software packages.

U.S. Pat. No. 4,449,233 to Brantingham discloses a speech synthesis system with parameter lookup table which uses preprogrammed speech synthesis responses which correspond to the user's keyboard input. The system comprises a self-contained educational system but is significantly different from the teachings of the present invention because the patented device is not designed nor intended to be utilized with existing preprogrammed computer software so as to comprise commands to operate such software. Also, the patented system does not include any voice recognition capabilities.

U.S. Pat. No. 4,462,080 to Johnstone, et al. discloses a voice actuated machine control device which may be utilized so as to operate a machine tool through voice commands inputted into a microphone which are transmitted into a logic circuit. The device includes structure for interpreting commands received from the operator which structure feeds these commands to a machine tool control system which, responsive to the commands, operates the machine. The present invention is significantly different from the teachings of this patent for many reasons. Firstly, in the present invention, the inventive system is electrically connected between the keyboard and the computer of an existing system whereas this is not the case with the patented invention. Further, the present invention may be programmed to respond to a number of commands to operate existing computer software programs which is not contemplated in the patent. Further, the present invention may be preprogrammed to guide the user to train the system for the exact commands which are desired. Such is not the case in the patent. Additionally, in the present invention, voice commands are given to the computer as if they were keyboard inputs or alternatively, keyboard inputs may be used to provide the exact same commands. Other differences exist but it is believed that the above-described differences are sufficient to demonstrate that the present invention is distinct from the teachings of this patent.

Publication entitled "Key Tronic Speech Recognition in a Keyboard Peripheral" discloses a speech recognition keyboard including the speech recognition circuitry built into the keyboard itself so that if one wishes to use this device, one must replace the existing keyboard with the Key Tronic keyboard. This is different from the teachings of the present invention wherein the present invention is merely incorporated into the circuitry between the existing keyboard and computer and operates in a manner so that the keyboard functions are maintained in a superior hierarchy to the voice recognition functions so that the user may either utilize the voice recognition functions or the keyboard, whichever is desired.

Further, the Key Tronic device includes an applications mode wherein the keyboard and speech recognition unit act independently of the host computer and the host computer requires a bidirectional link during the time that the speech pattern is up loaded and down loaded. The system further includes a set-up mode which may be initiated by running a voice utility program on the host computer. This program sends various commands to the Key Tronic Keyboard and receives responses back. While in the set up mode, the user may create a vocabulary, train a vocabulary, test a vocabulary and up load/down load a vocabulary. Other aspects of the Key Tronic device should be self-evident. The Key Tronic device is significantly different from the teachings of the present invention because the present invention is easily operated merely by pressing function keys, the present invention is preprogrammed to function so as to transmit commands for specific pre-existing software programs, the present invention's training is preprogrammed, the present invention does not require replacing the keyboard but operates in conjunction with the existing keyboard and further, the present invention does not include an application program in the computer's RAM memory since everything is controlled from the ROM memory of the inventive system, thus, avoiding the necessity for the user to think.

Publication entitled "IntroVoice III, Speech recognition in an Enhanced IBM Keyboard" discloses a system quite similar to the Key Tronic system and as such is distinct from the teachings of the present invention for the same reasons as set forth hereinabove concerning the Key Tronic system.

Other voice recognition systems are known to Applicant. These systems are (1) the Vocalink Model SRB Speech Recognition Board, (2) the NEC SR-100 Voice Input Terminal, and (3) the Micromint Lis'ner 1000 Voice Recognition and Synthesis Board. Each of these systems is distinct from the present invention in that each system needs a board which is to be plugged into a computer slot in a similar manner to an input slot inside an IBM personal computer. Thus, the computer will therefore have one less slot available for other uses and further the computer will need a utility program to run in the personal computer's RAM memory in order to direct input from the specific slot, to be treated as a keyboard input. This results in the personal computer's RAM memory being at all times occupied by this utility program which means that the system cannot run programs which require this RAM memory space. These systems, additionally, are different from the present invention in that (1) in each case, a board is needed to be inserted into a slot in the computer, (2) none of the systems has preprogrammed set-ups for a specific program, (3) none of the systems may be operated by merely pressing function keys, (4) each of the systems requires an application program to reside in the computer's RAM memory at all times, (5) none of the systems utilizes a preprogrammed training mode to train the computer to receive selected commands, and (6) none of the systems up loads and down loads over the keyboard input port.

Accordingly, a need has developed for improved voice control systems which may be simply incorporated into an existing computer system, which may easily be trained and which may be used in a simple way to control a computer when using existing software packages.

SUMMARY OF THE INVENTION

Accordingly, in order to fill the needs now required in this area of technology and in order to overcome the deficiencies in the prior art devices described hereinabove, the present invention has been developed. The present invention includes the following combination of inventive features:

(a) In a first aspect of the present invention, the present invention is embodied in a system which may be easily installed in conjunction with an existing computer system including a microprocessor or computer and a keyboard inputting device. In this regard, the inventive system is incorporated in a package which may be electrically connected to the existing computer system between the keyboard inputting device and the computer or microprocessor.

(b) The present invention is intended, in the preferred embodiment, to enable the user thereof to operate existing computer disk operating systems like MS DOS ™ or major software programs such as Lotus ™ 1,2,3; VisiCalc ™ and other known such programs. The present invention operates by enabling the user to operate these programs and operating systems through the use of voice commands, keyboard inputs or both.

(c) The present invention includes a training mode wherein the user may program their voice into the computer memory via a microphone. During the programming phase, the user speaks words which correspond to commands for operation of the software or operating systems in a predetermined sequence as preprogrammed by the computer. For example, the computer will cause the word "find" to be displayed on the associated displaying device. Then, the computer will cause the display to give an indication that the user is to speak the word "find" into the microphone. At this point, the user speaks the appropriate word into the microphone.

(d) When the word is spoken into the microphone, signals indicative of the word are received by a voice recognition chip which forms a part of the present invention. A linear predictive coding (LPC) analyzer is basically a lattice of filters that approximate a series of resonant cavities, thus simulating the vocal tract. The filter constants are sampled over the time it takes to speak the word. The unique characteristic of the spoken word is found by averaging and data compression. The result is a template representative of each word which is stored in the Voice Control System's RAM memory. This voice recognition chip is an "off-the-shelf" component which is utilized in the present invention in a new and unique way.

(e) The present invention includes a test mode wherein the user may test the quality of the templates created in the training mode. During the test phase the system will cause a command to be displayed on the screen and ask the user to say this word. If the system matches its voice recognition parameters with the word on the display, the system will give an indication that this word is correctly tested and move on to the next command. If there is no match, the system will tell the user so and ask the user to retrain this command.

(f) The present invention is preprogrammed in the preferred embodiment to include at least 64 commands for each of the desired popular software packages. These commands are stored on the system's floppy disk as templates for a common "wide user group." If the user does not choose to train the system these templates will be used.

(g) The present invention includes a control means, which is able to read the function keys on the existing keyboard. The system is turned on by holding down the function key #1 for a predetermined time. The training mode is selected
by pressing the function key #1 a second time. The existing software programs are selected by pressing the relevant function keys #2-9. The test mode is selected by pressing function key #10.

(h) The present invention has the necessary template files and command files for each of the popular software packages stored on the system's floppy disk. All the control programs reside in the system's ROM memory, which include programs to load programs from the floppy disk to the RAM memory in the system and from the system's RAM memory to the system floppy disk via the computer's keyboard input/output port.

(i) Since voice recognition systems which may be used in conjunction with the present invention have an accuracy of at least 96%, the present invention may be designed so as to be essentially foolproof. In order to ensure 100% accuracy, the present invention is preprogrammed so that the user must confirm the essential commands which have been given to the computer by saying "yes" as a confirmation before the command is undertaken. Thus, the user may speak the appropriate command, which command is then displayed on the computer display. If the displayed word corresponds to the spoken word, confirmation is given by saying "yes." If, on the other hand, the displayed word differs from the spoken word, such may also be communicated to the computer by saying "no" and the computer will then re-inquire as to the desired command.

(j) The present invention may also be utilized to move the cursor on the display. The present invention operates by enabling the user to move the cursor on the display through the use of voice commands, cursor control inputs or both. The cursor control inputs include cursor control button, the mouse, the digitizer, etc.

These and other objects, aspects and features of the present invention will be better understood from the following detailed description of the preferred embodiments when read in conjunction with the appended drawing figures.

SPECIFIC DESCRIPTION OF THE PREFERRED EMBODIMENTS

Figure 1:
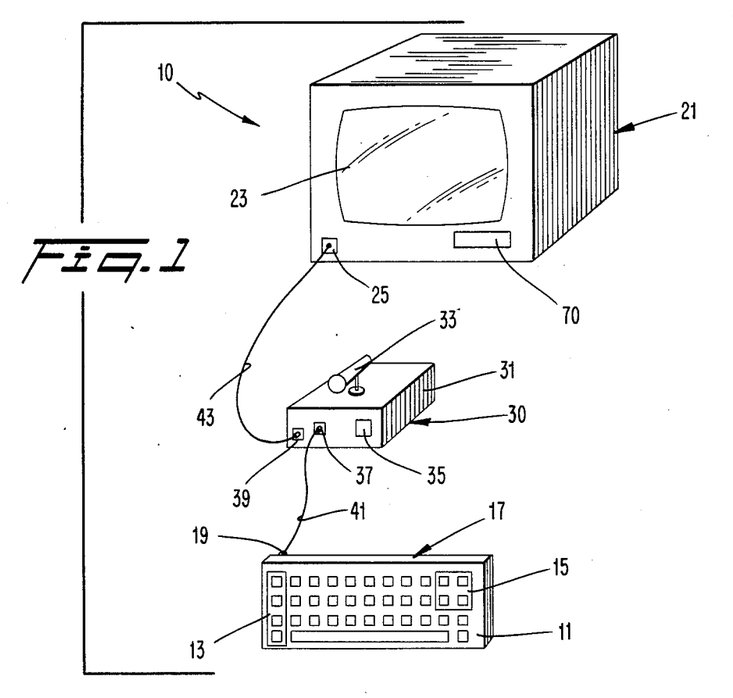
FIG. 1 shows a schematic view of the present invention as connected into an existing computer system.
Figure 2:
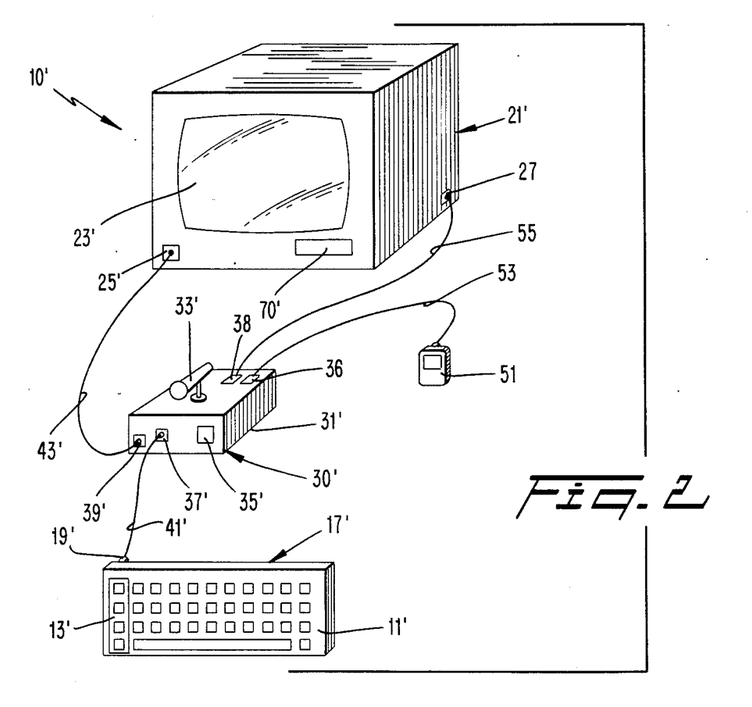
FIG. 2 shows a modified version of the embodiment of FIG. 1 in the situation wherein the computer system includes a "mouse."

With reference now to FIGS. 1 and 2, the connection of the present invention into two embodiments of existing computer systems will be explained.

FIG. 1 shows in schematic form an existing computer system 10 including a keyboard 11 having function keys 13, cursor control keys 15 and other keys 17. The system 10 further includes a computer 21 including a display means 23 and a disk drive 70. The keyboard includes a connector 19 which is intended to be connected through a cable with a connector 25 in the computer 21. The present invention in FIG. 1 is designated by the reference numeral 30 and includes a housing 31 having mounted thereon a microphone 33. An on-off light 35 is provided as are connector ports 37 and 39. As seen in FIG. 1, the connector port 37 is intended to connect via a cable 41 with the port 19 on the keyboard whereas the connector portion 39 of the system 30 is intended to be connected by the cable 43 with the port 25 on the computer 21. In this way, the present invention 30 is interconnected into the existing computer system 10. The circuitry within the housing 31 is specifically designed so that the system 30 draws all of its power from the host computer system 10 and accordingly no alteration of the hardware or software of the existing system 10 is necessary. The circuitry within the housing 31 is specifically designed so that with the system 30 connected into the existing system 10, the user is still able to use the keyboard as an entry form. A priority switch (not shown) gives the keyboard the priority over the voice entry, the on-off light 35 is off when the voice entry is not used, and on when the voice entry is used. Thus, the keyboard may be used as if the system 30 were never connected into the system 10. Thus, the user may use the keys 13, 15 and 17 in the keyboard to move the cursor on the computer screen, change functions and give other commands to the computer or, if the user desires, the user may utilize voice commands via the microphone 33 to perform these functions.

Reference is now made to FIG. 2 wherein like elements and structure are given like primed reference numerals. As seen in FIG. 2, the system 10' includes a keyboard 11' having keys 13', and 17' thereon. The keyboard further has a port 19' which in the original state is connected to a connector port 25' in the computer 21' through a cable (not shown). The computer 21' also includes a display 23', a disk drive 70', and a mouse port 27 which is provided for connection with a mouse 51 as is well known in the art. The inventive system 30'includes a housing 31', connector ports 37' and 39', an on-off light 35', a microphone 33' mounted thereon and further ports 36 and 38 for a purpose to be described hereinafter. In a similar fashion to the embodiment of FIG. 1, when the system 30' is incorporated into the system 10' the ports 19' and 37' are interconnected cable 41', and the ports 39' and 25 are interconnected together by the cable 43'.

As seen in FIG. 2, as stated above, the system 10' includes a mouse 51. In order to connect the system 30' into the system 10', port 36 on the housing 31' is provided to connect with the mouse 51 via the cable 53.

Further, the port 38 on the housing 31' is provided to interconnect the system 30' with the original mouse port 27 via the cable 55. Thus, the ports 36 and 38 are provided so as to enable the interconnection of the mouse 51 into the circuit including the original system 10' and the present invention 30'. The mouse 51 can be used to move the cursor on the display 23' as if the system 30' was not connected to the system 10'.

Figure 3:
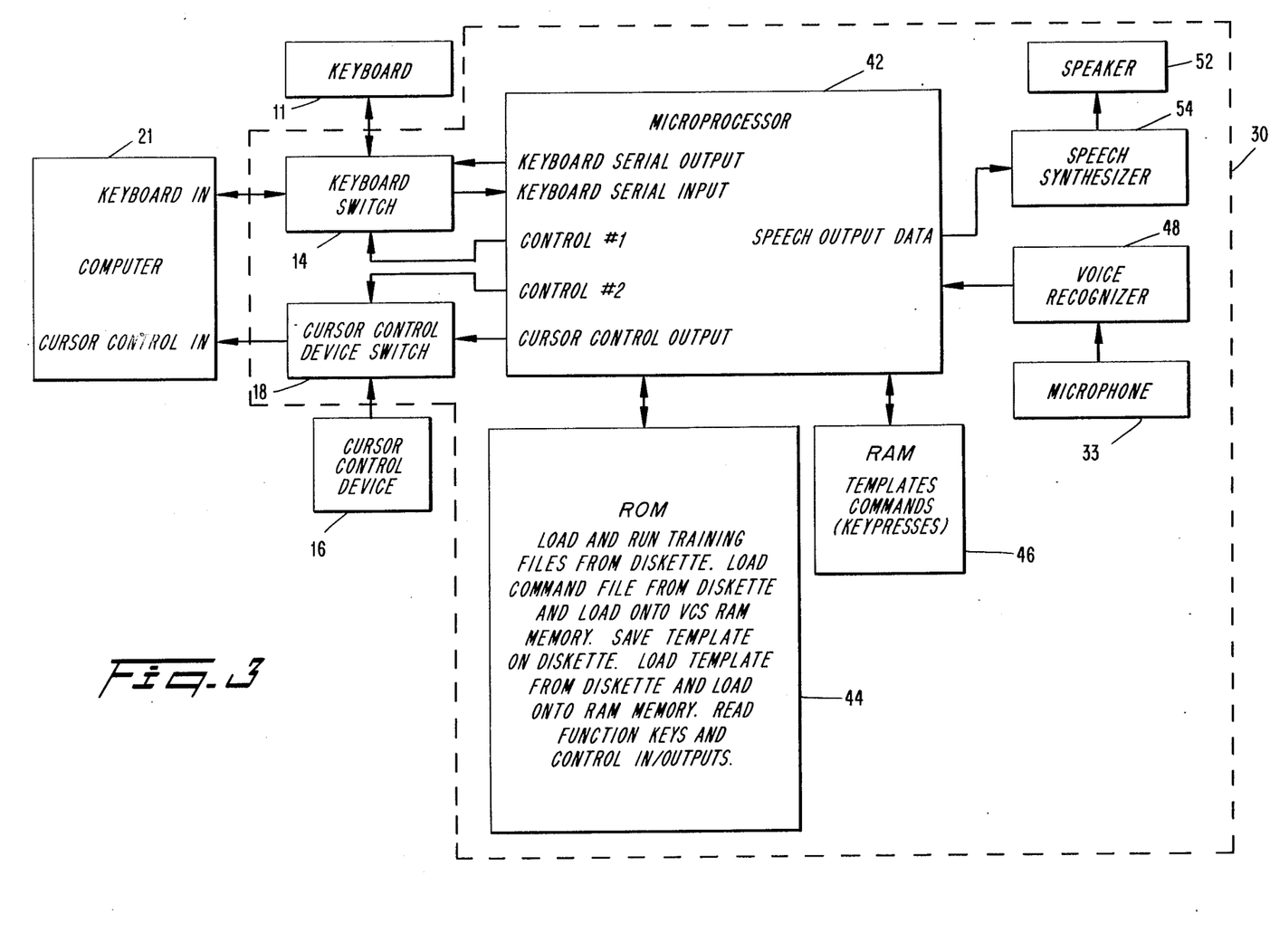
FIG. 3 shows a block diagram of the voice control system of the present invention showing details of the microprocessor memories thereof.

FIG. 3 shows a schematic depiction of the present invention in functional form. Some of the reference numerals in FIG. 3 correspond to those set forth in FIGS. 1 and 2 and other reference numerals in FIG. 3 not shown in FIGS. 1 and 2 depict structure not shown in FIGS. 1 and 2.

FIG. 3 shows the computer 21, the keyboard 11, a keyboard switch 14 which interfaces the keyboard and computer, a cursor control device 16, a cursor control device switch 18 which interfaces the cursor control device 15 with the computer 21, add the inventive system 30.

As seen in FIG. 3, the system 30 includes a microprocessor 42, a read only memory (ROM) 44 associated with the microprocessor 42, a random access memory (RAM) 46 associated with the microprocessor 42, the microphone 33 as seen in FIGS. 1 and 2, a voice recognizer chip 48 interposed between the microphone 33 and the microprocessor 42, a speaker 52 and a speech synthesizer chip 54 interposed between the speaker 52 and the microprocessor 42. As should be understood from FIG. 3, the control program in the read only memory 44 is provided to (1) load and run training files from the floppy disk, (2) load command files from the floppy disk and save them on the random access memory 46 of the system 30, (3) save trained templates on the floppy disk, (4) load templates from the floppy disk and save them on the RAM memory, (5) read the function keys and (6) control the computer's keyboard input/output port 25.

The random access memory 46 provides temporary and non-permanent storage of templates which have been created during the current operation of the system 30, which relates to the commands used in the popular software packages. Each template is related to a command which in turn also is stored as keypresses, so when they are sent to the computer 21, the computer 21 will think they came from the keyboard 11.

Figure 4:
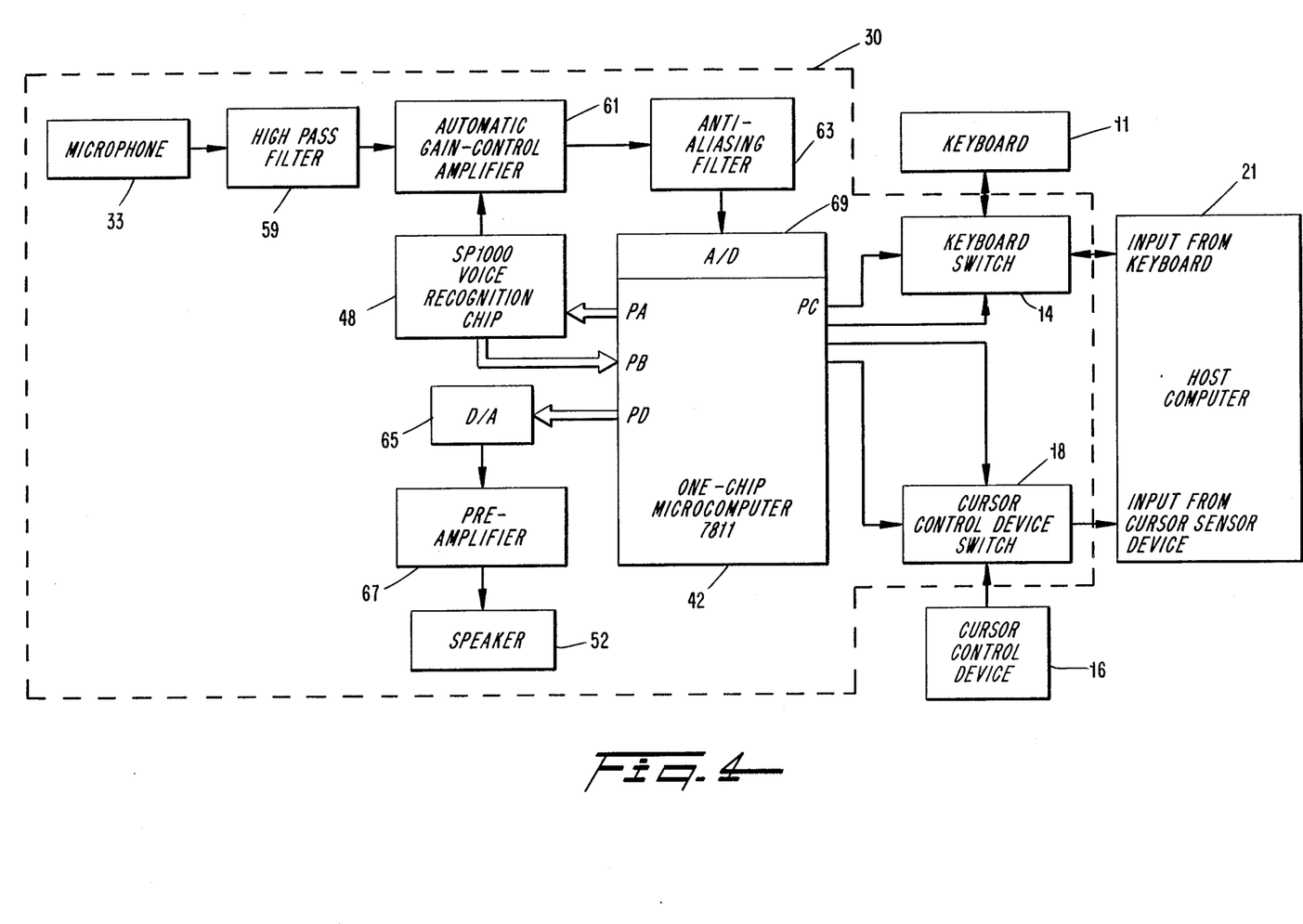
FIG. 4 shows a further block diagram for the voice control system showing details of the particular components thereof.

FIG. 4 is similar to FIG. 3 but shows more details of the specific electronics of the system 30. In particular, FIG. 4 shows that interposed between the microphone 33 and the microprocessor 42 are a high pass filter 59, an automatic gain control amplifier 61, an anti-aliasing filter 63, and an analog-to-digital converter 69 which may be intergrally incorporated into the microprocessor 42 if desired. FIG. 4 shows that the speaker 52 is connected to the microprocessor 42 via a digital-to-analog converter 65 and a pre-amplifier 67. As suggested by FIG. 4, the microprocessor 42 may comprise a one-chip microcomputer model number 7811 made by NEC. Further, FIG. 4 suggests that the voice recognition chip 48 may, if desired, comprise an SP1000 chip manufactured by General Instruments. This chip is also used for speech synthesis. The microcomputer 7811 includes the ROM 44 and the RAM 46 shown in FIG. 3. Of course, these are to be considered merely examples of the electronic devices which may be utilized in the present invention as many voice recognition chips and microcomputers are suitable for use with the present invention.

Figure 5A:
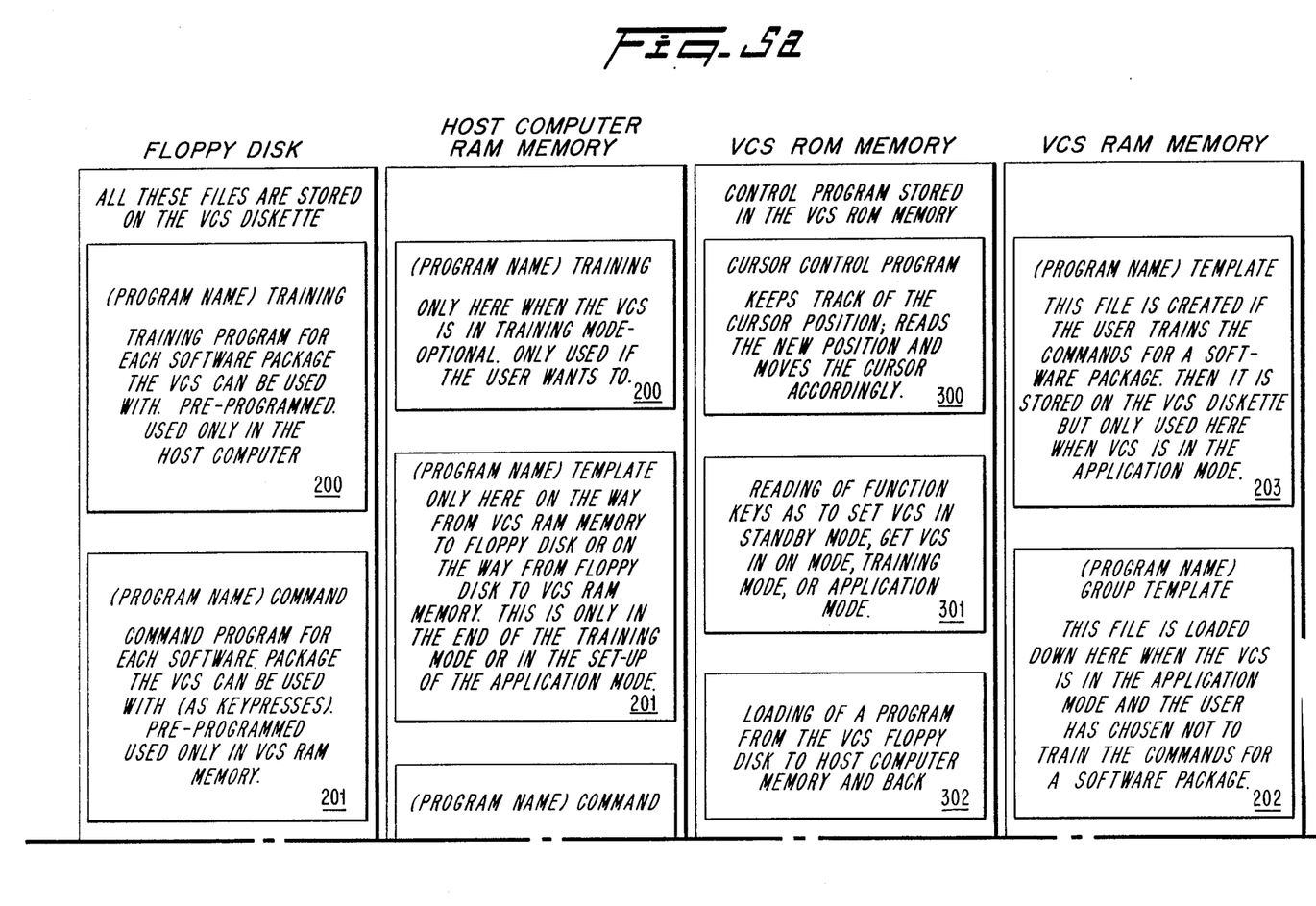
FIGS. 5a and 5b show block diagrams of the software utilized in the present invention.
Figure 5B:
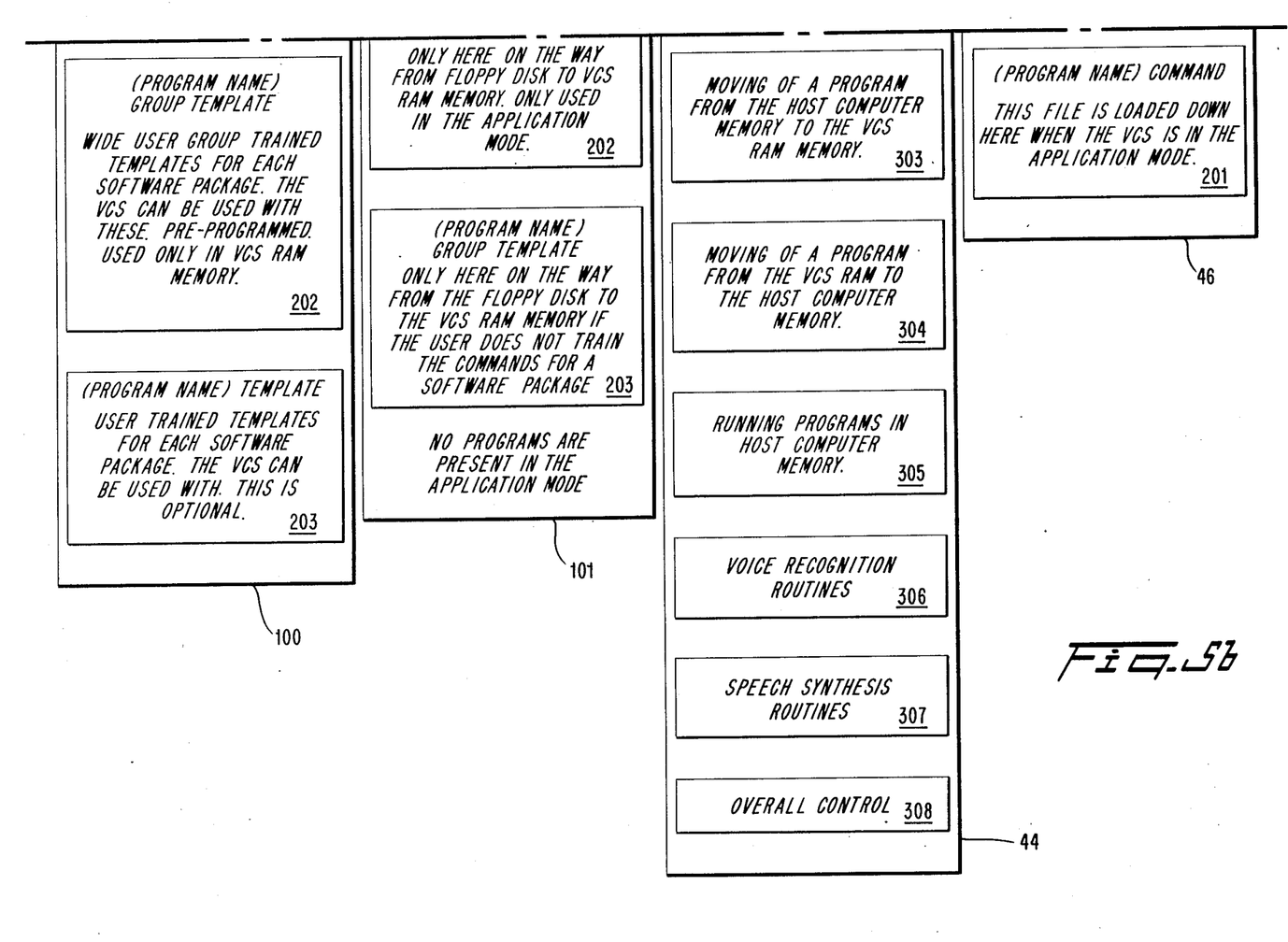

FIG. 5 depicts the overall blocks of software as programmed into the present invention 30. It shows: (1) the programs which are stored on the floppy disk 100; (2) the programs 101 which will be in the host computer's RAM memory at one time or another; (3) the programs which are permanently in the system's ROM memory 44; and (4) the programs which will be in the system's RAM memory 46.

The software in the floppy disk 100 includes: (1) the training program 200 for each of the various popular software packages now on the market such as VisiCalc TM and Lotus TM 1,2,3. These programs are run by the control program when the relevant function keys are pressed. The program guides the user through the training process by displaying each word which corresponds to a command in the chosen software package and asks the user to say this word; (2) the templates 203 created through the training process in 1 above for each software package as processed by the voice recognition part of the system; (3) the wide user group templates 202 for each software package which are pretrained in order to cover a wide user group with almost the same voice pattern. If the user does not train the system for a software package, these templates will be used in the application mode of operation; (4) the command program 201 which includes the commands, represented as keypresses, which relate to each template which in turn relate to each spoken word, trained by the user or pretrained from the factory. They are stored as keypresses so that when they are sent to the computer keyboard input/output port 25 the computer 21 will think they came from the keyboard 11.

The floppy disk 100 is to be inserted to the disk drive 70 in the computer 21.

The software in the computer 21 RAM memory includes: (1) the training program, 200, which is loaded down from the floppy disk by the control program 302. This program is only present here when the user has selected the training process for a specific popular software package by pressing the function key #1 twice and the function keys #2-9 of the software package of choice. This puts the system in the application mode; (2) the trained templates 203 are only here on their way from the system's RAM to the floppy disk or on the way from the floppy disk to the system's RAM. This happens only in the end of the training mode or in the set-up of the application mode; (3) the commands 201 are stored as keypresses, as they relate to each template, which are only here on their way from the floppy disk to the system's RAM memory; (4) the pretrained wide user group templates 202 which are only here on their way from the floppy disk to the system's RAM if the user does not train the commands for the software package.

No programs are present in the computer's RAM memory 21 when the system is in the application mode.

The software in the RAM memory 46 of the system 30 includes: (1) the trained templates 203 for the chosen software package, if the user has trained the words for the chosen software package; (2) the pretrained wide user group templates 203 for the chosen software package, if the user has not trained the words for the chosen software package; (3) the commands 201, stored as keypresses, for the chosen software package.

The use of a floppy disk to store all the relevant programs 200-203 allows the system to only use a very small amount of RAM 46, namely only sufficient memory to store a template file, trained or pretrained (203 or 202) and a command file 201.

The software in the ROM 44 of the system 30 includes: (1) the program 301 to read the function keys and set the system in the appropriate mode; (2) the program 302 which loads a program from the floppy disk onto the host computer's RAM memory and the reverse way; (3) the program 303 which loads a program from the host computer's RAM onto the RAM of the system 30; (4) the program 304 for loading a program from the RAM of the system 30 to the host computer's RAM; (5l) the program 305 to run programs in the host computer; (6) the program 306 which includes all the voice recognition subroutines such as: (a) creation of a template; and (b) the matching of incoming templates with stored templates; (7) the program 307 which includes all the speech synthesis subroutines such as creating sound signals from a generated synthesis signal, (8) program 308 which keeps the overall control of the systems hardware and software; (9) the program 300 which is the cursor control program, which allows the cursor control device to have priority over the spoken word by setting the cursor control switch accordingly. It further keeps track of the cursor position so it can move the cursor accordingly to the voice input.

In the training mode of the present invention, a training program 200 is preprogrammed and stored on the floppy disk of the inventive voice control system for each software package. When the training mode is selected for a software program, the training file already in the floppy disk is loaded from the floppy disk and run on the host computer. This program will be displayed on the host computer screen and will show everything the user has to do, that is, the program will instruct the user when and how they say the appropriate words so that they may be stored as templated representative of the user's voice on the floppy disk. Thus, the words will be shown on the computer display when the computer wishes the user to speak those words and an audible feedback is provided to indicate if the computer has accepted or rejected the spoken word. Since the training program is specifically designed to reside solely on the floppy disk, the training proram does not require the use of any of the RAM or ROM memory of the voice control system 30. The training program is only run when it will not intefere with other programs which the user is using on the host comptuer 21. The present invention is specifically designed so that no part of the host computer's RAM memory is being used when the user is running a program with the voice control system 30 connected into the computer system 10.

Figure 6:
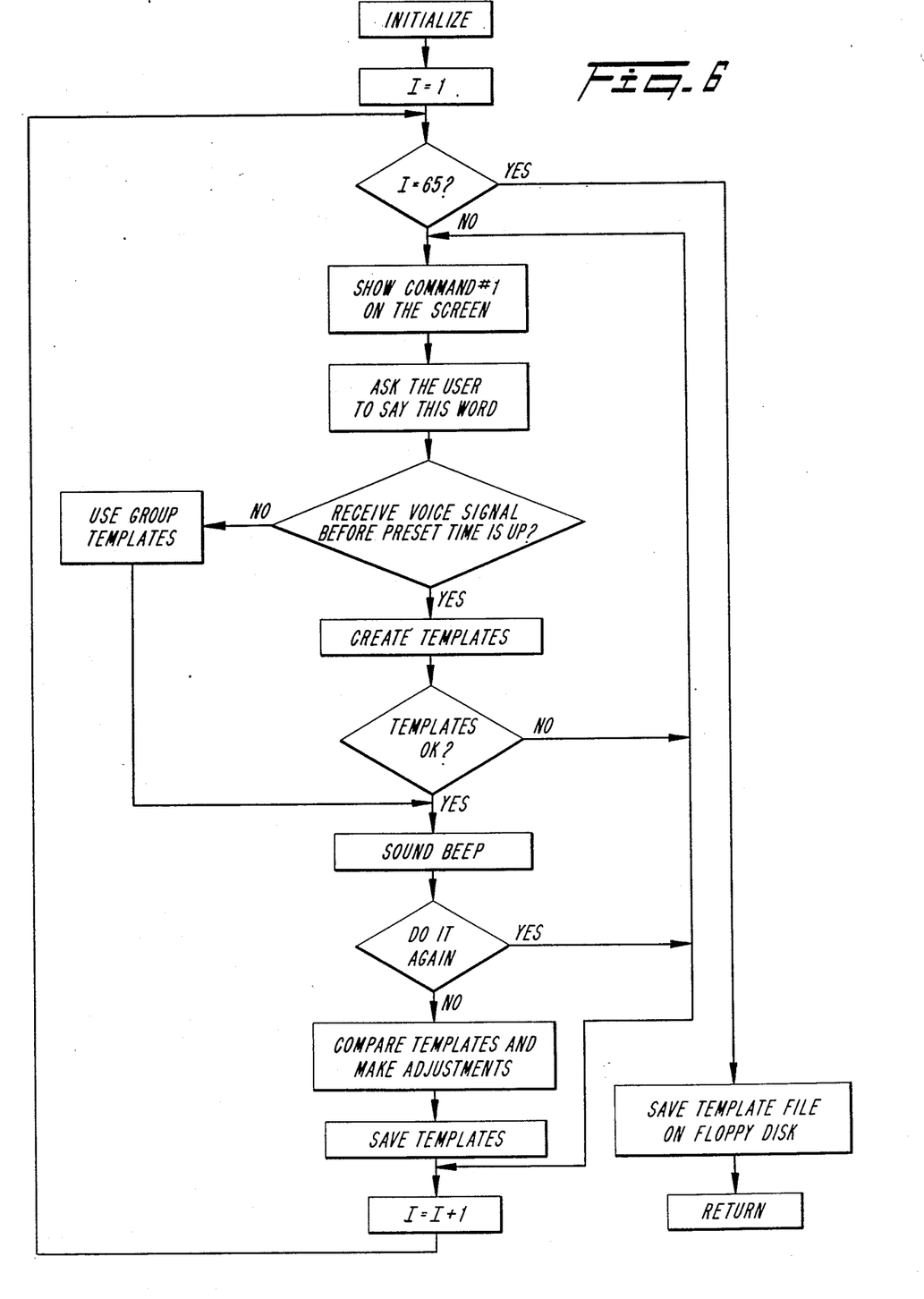
FIG. 6 shows a flow chart of the training subroutine utilized in the present invention.

FIG. 6 shows a flow chart of the training subroutine which is utilized to save on the floppy disk the various voice commands as templates to run computer programs such as VisiCalc TM and Lotus TM 1, 2, 3. By following the routine set forth in the flow chart of FIG. 6, the commands which are needed are saved as templates on the floppy disk representative of the user's own voice.

Figure 7:
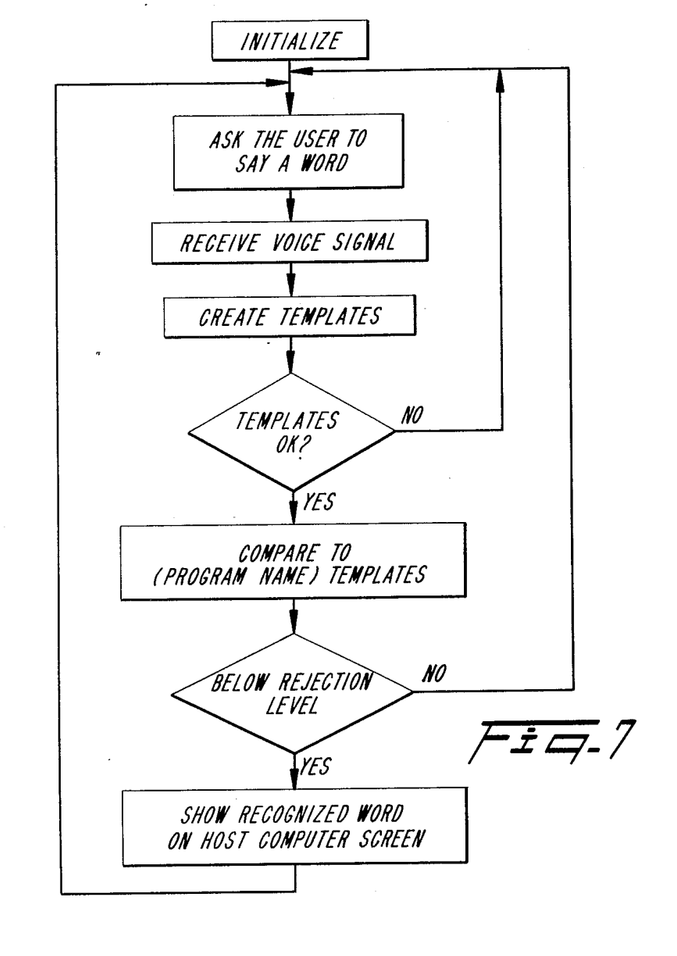
FIG. 7 shows a flow chart depicting the operation of the test program of the present invention.

FIG. 7 shows a flow chart for the test program which flow chart is followed so as to be able to test how well the templates that are representative of the commands for each software package work for the user. The templates can be the templates trained by the user or the pretrained wide user group templates. The test program is essentially the same as the training program, but with a different control routine.

Figure 8:
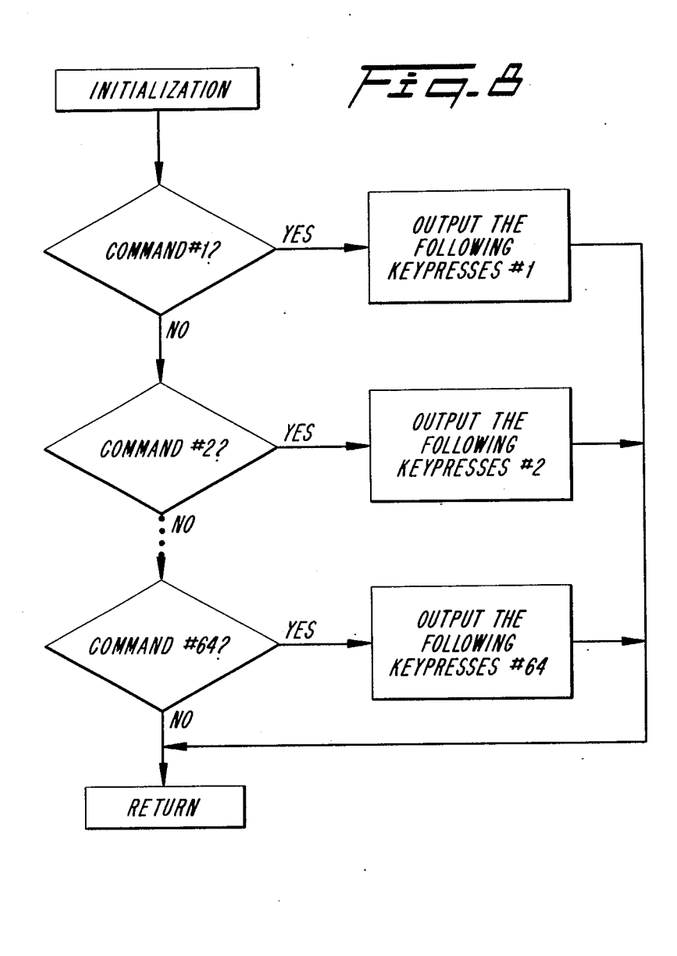
FIG. 8 shows a flow chart for the command subroutine of the present invention.

In the preferred embodiment of the present invention, at least 64 commands from the popular software packages described above may be selected and saved on the floppy disk as templates representative of the user's own voice. These commands are translated into keypresses of the keyboard associated with the host computer as if they had been typed into the computer from the keyboard. These commands are preprogrammed and stored in a file corresponding to the software package which receives these particular commands and this file may be loaded from the floppy disk of the present invention onto the RAM memory in the host computer and further onto the RAM memory of the inventive voice control system 30 when the application mode is selected for that particular software package. An explanation of the operation of this aspect of the present invention is depicted in FIG. 8 which shows a flow chart for the command subroutine whereby the host computer receives voice commands and translates them to the corresponding keypresses. The advantage of this aspect of the present invention is that it does not require a large capacity ROM memory and RAM memory.

Figure 9:
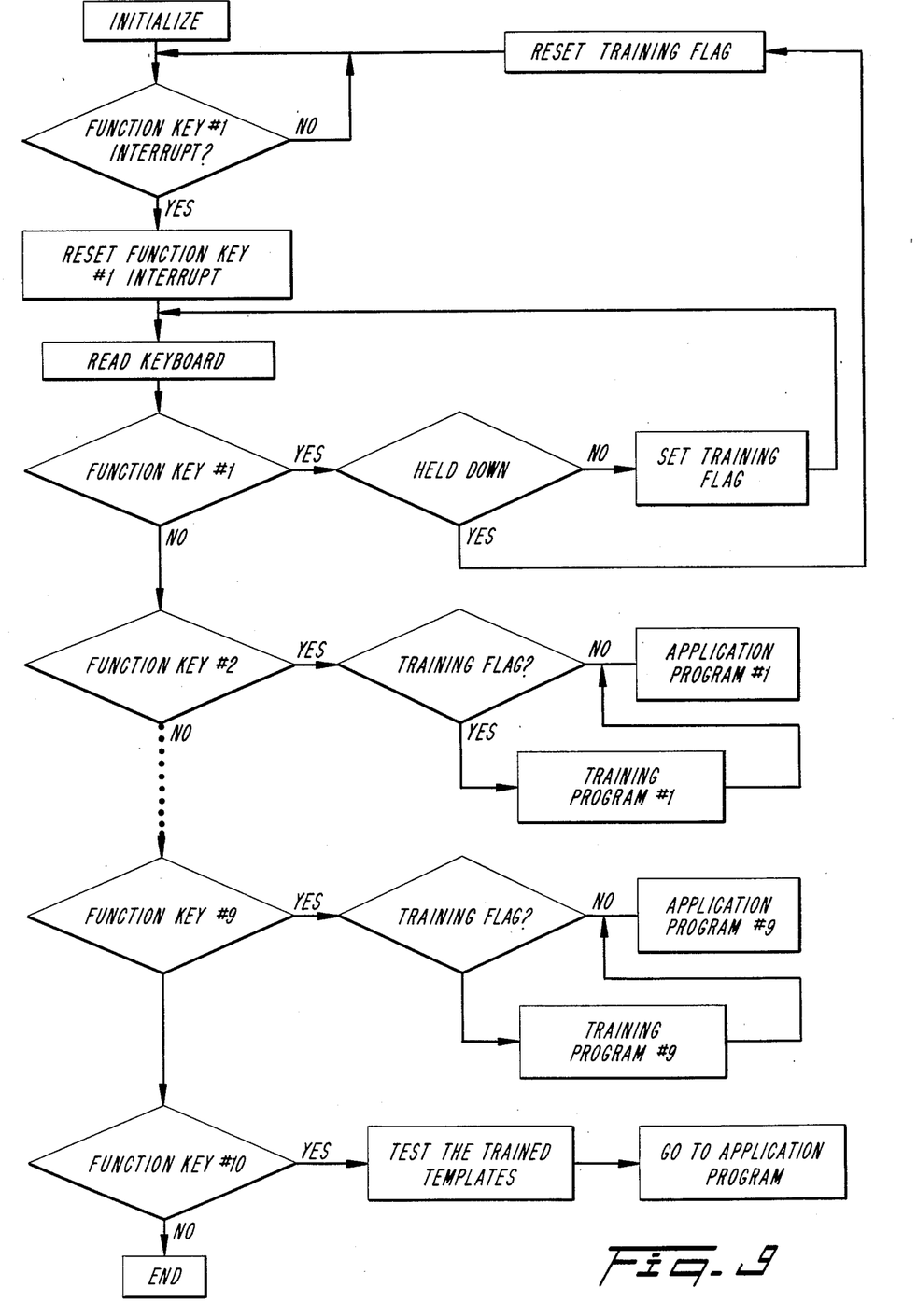
FIG. 9 shows a flow chart for the control program of the present invention.

With reference now to FIG. 9, the operation of the control program of the present invention will now be explained. It is important to understand that the control program controls all functions of the inventive voice control system 30. The control program is preprogrammed into the ROM memory 44 of the inventive system 30. The system 30 is designed to go into a standby mode when the host computer is turned on with the inventive system preconnected thereto. What this means in actual practice is that a keyboard switch is set so that the keyboard input is sent directly to the host computer. The inventive system 30 is turned on if, for example, the function key #1 is held down for a preset length of time. This act interrupts the voice control system 30, turns it on and closes the direct path from the keyboard 11 to the host computer 21 in the keyboard switch. The voice control system 30 reads the keyboard in order to see what operation and program the user has selected by pressing the various function keys 13. The voice control system 30 will go into the next mode when the selection process has been completed. If desired, the user may cancel all selecions by holding the function key #1, for example down for a predetermined length of time which will result in the inventive voice control system 30 going back into the standby mode.

When the inventive system 30 is installed into the computer system as shown in FIGS. 1 and 2, the system 30 reads the various depressions of the function keys and if a training flag has been set by depressing function key #1 again on the keyboard 11, the voice control system 30 will then be placed in the training mode. What this means is that when the user presses the function key of the program which has been chosen, the training file for that program will then be loaded from the floppy disk of the voice control system 30 into the host computer's RAM memory and will then be run. This program will then send the user through the training process as described, for example, in FIG. 6, and when this is completed, the user's templates will be stored on the floppy disk of the voice control system 30 automatically. These templates will be retained in the RAM memory 46 of the voice control system 30 and the command file for the program of choice will then by saved on the voice control floppy disk.

If the training button on the keyboard 11 has not been pressed, but only the function key thereof for the software package of choice has been depressed, the control program will see if the user has trained the voice control system 30 for this program and will find the user's file on the floppy disk of the voice control system 30 and will load this file onto the host computer's RAM memory and further down to the voice control system 30 RAM memory 46. If the user has not trained the voice control system 30 for this program, the control program will load the "wide user group" templates for this program from the voice control system 30 diskette onto the host computer's RAM and further down to the voice control system RAM memory 46. The system will then further load the commands for the program of choice onto the host computer's RAM memory and down to the voice control system's RAM memory 46.

The control program as described in FIG. 9 also controls the switches. If a voice recognition signal is detected by the voice recognition part of the system 30, a switch will turn the keyboard off and send the keypresses which relate to this word or command out to the host computer 21. When this is done, the link is turned off from the voice control system 30 to the computer 21 and the keyboard is reconnected to the host computer. This allows the user to either voice input commands or input commands through the use of the keyboard 11.

Figure 10:
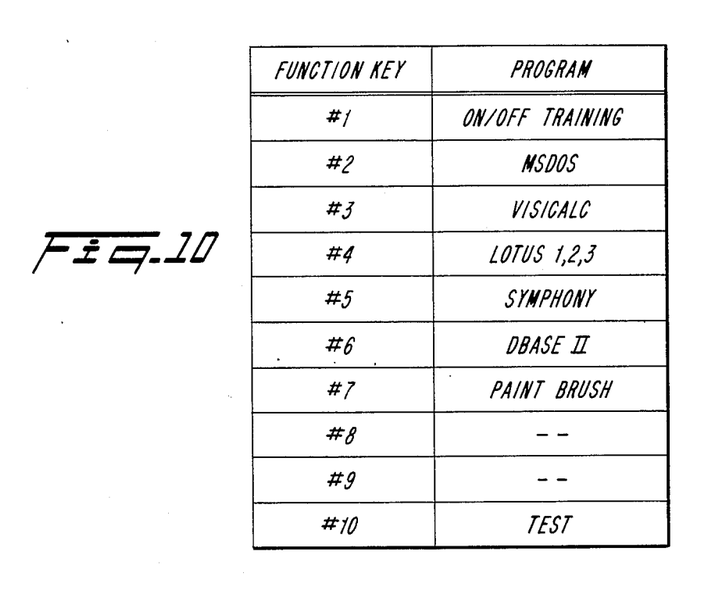
FIG. 10 shows the meaning of the functions keys of the present invention.

FIG. 10 shows the meaning of the function keys in one example of the present invention. Function key #1 is used to turn the voice control system on-off and also to set it in the training mode. Function keys #2-9 are used to select the wanted software packages and set the voice control system in the application mode. The software packages shown here are only examples. Function key #10 is used to set the voice control system in the test mode.

Figure 11:
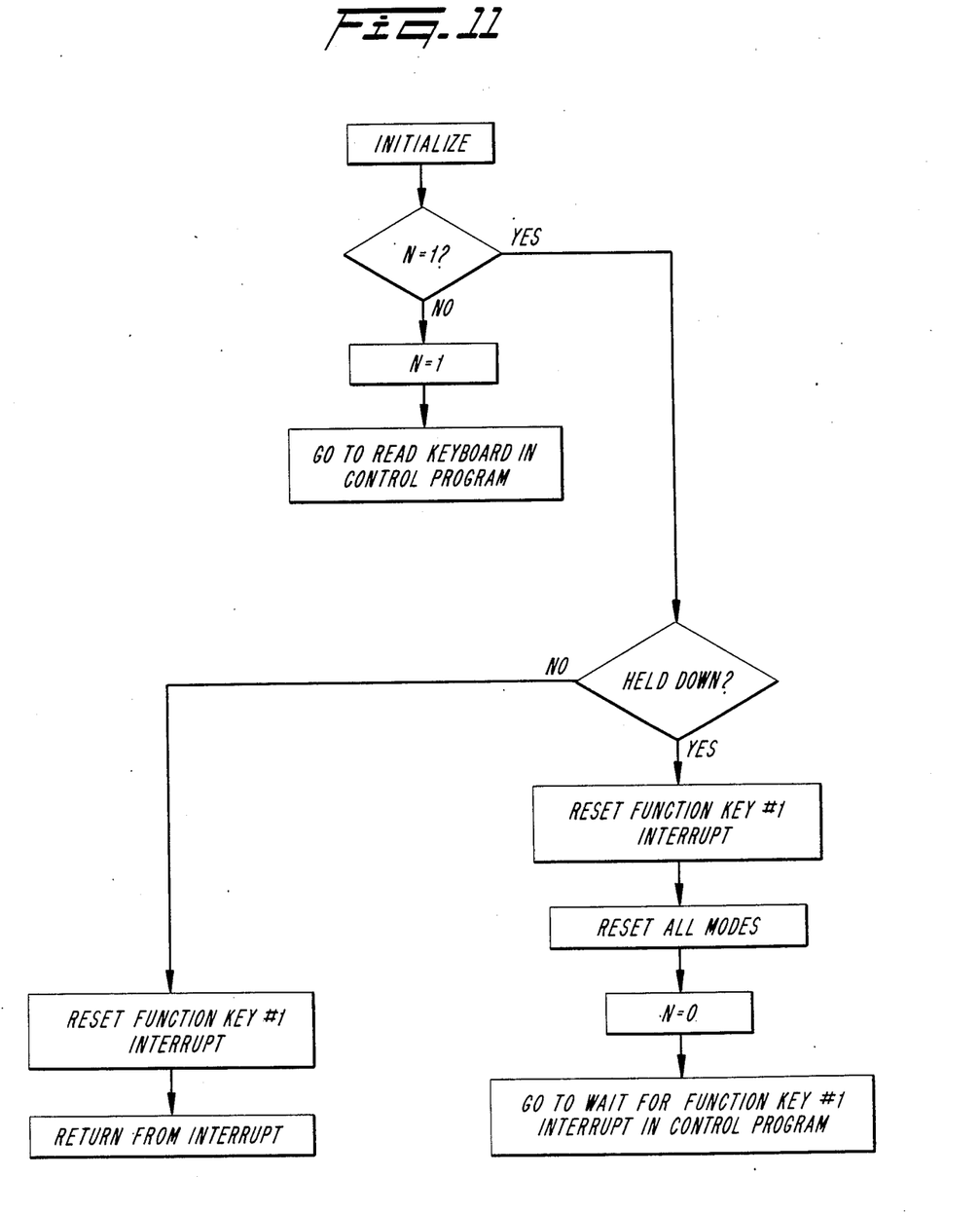
FIG. 11 shows a flow chart for the operation of an aspect of the present invention concerning the function key #1 interrupt handler.

As described above, the function key #1 on the keyboard 11 may be utilized as an "interrupt." FIG. 11 shows a flow chart describing the use of a function key #1 as an interrupt handler. FIG. 11 should be self-explanatory to those skilled in the art and explains how functional connection between the keyboard 11 and the host computer 21 may be selectively interrupted.

Figure 12:
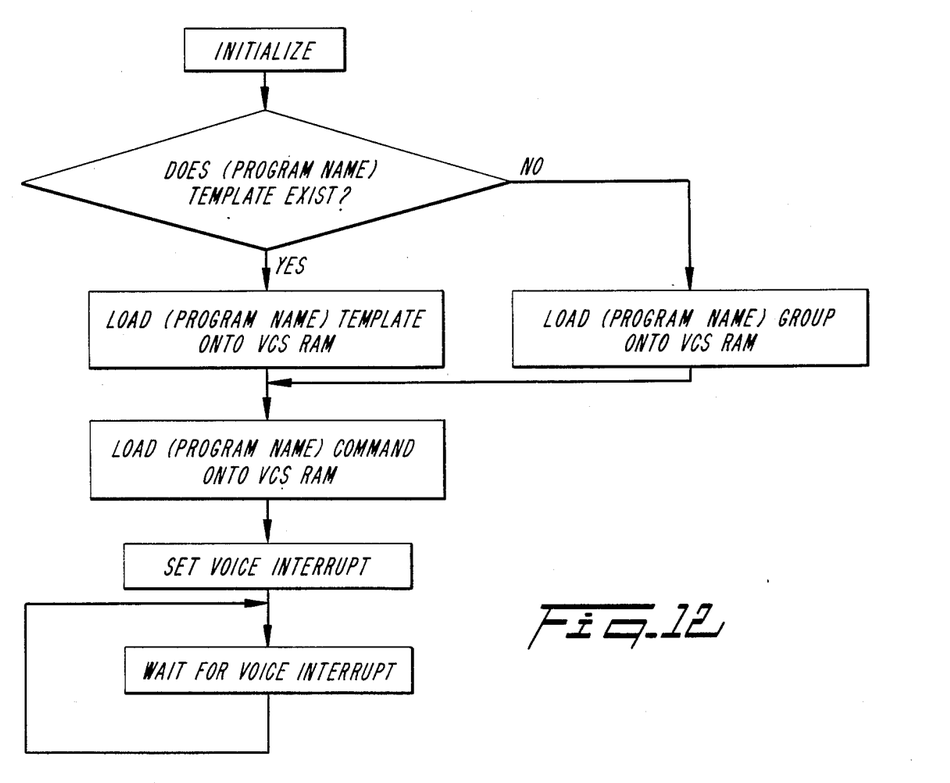
FIG. 12 shows a flow chart for the application program of the present invention.

FIG. 12 shows a flow chart for the application program. As should be understood from FIG. 12, this program enables the system 30 to search its memory upon activation of the program to see if a particular program, the name of which has been entered, in fact exists. If the program does in fact exist in a template, the program instructs the system 30 to load the template corresponding to this program onto the RAM memory 46 of the voice control system 30. If the user template program does not exist, the pretrained wide user group template program will be used. Then, as shown in FIG. 12, the voice interrupt aspect of the present invention is appropriately set so that the system may operate.

Figure 13:
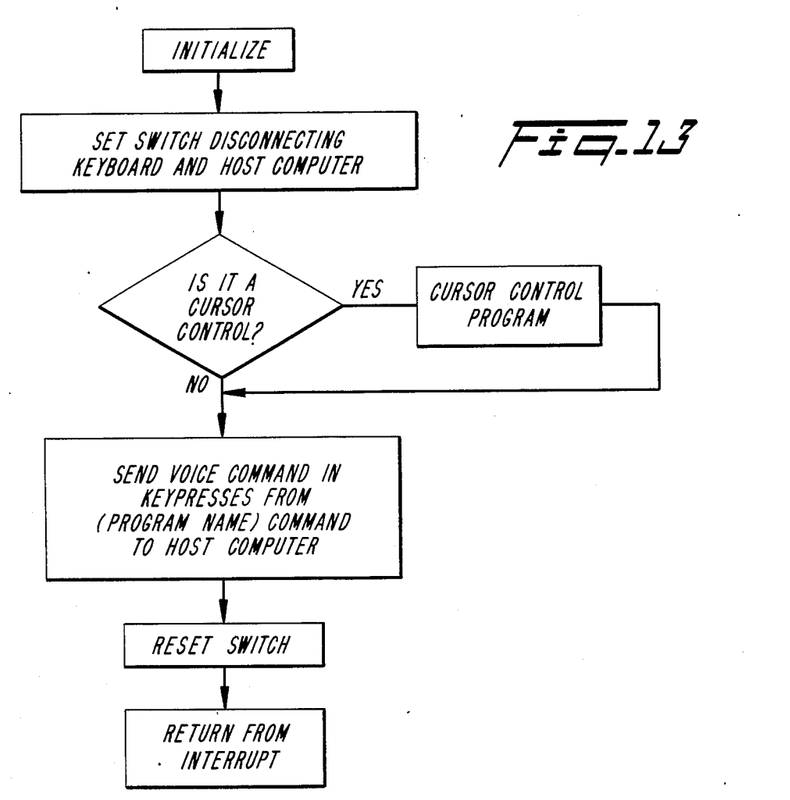
FIG. 13 shows a flow chart of the operation of an aspect of the present invention concerned with the handling of voice interrupts.

The voice interrupt aspect is better explained with reference to FIG. 13 which shows a flow chart of the voice interrupt handler. As shown in FIG. 13, when this aspect of the present invention is initialized, a switch is activated, disconnecting the keyboard and host computer from one another and allowing voice commands from a particular program which has been entered into the system memory to be conveyed to the computer to cause the various functions to be controlled and operated.

Figure 14:
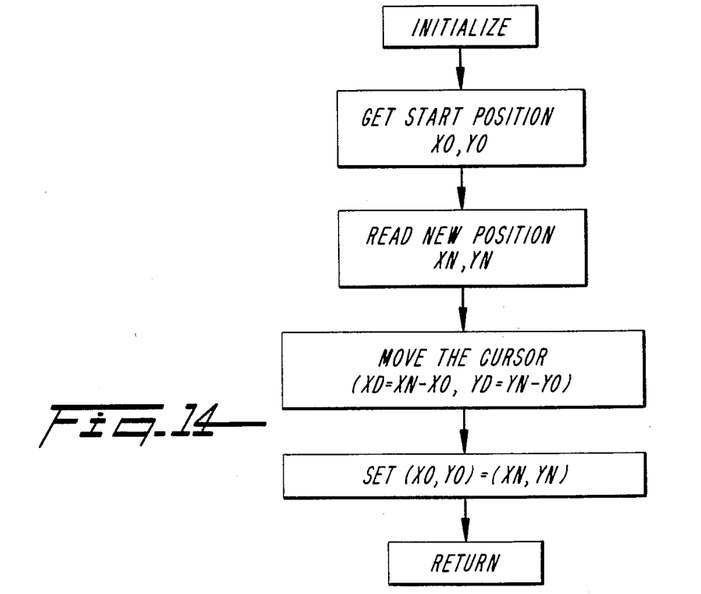
FIG. 14 shows a flow chart for the operation of the cursor control program of the present invention.

FIG. 14 shows a flow chart which when followed results in the ability to move the cursor on the display 23 of the host computer 21 to whatever position is desired. As FIG. 14 shows, voice commands are utilized to state the specific x and y coordinates where it is desired to locate the cursor. The host computer understands these commands and moves the cursor to the desired position.

Accordingly, an invention has been disclosed herein in terms of the various aspects and embodiments thereof which achieves each and every one of the objectives set forth hereinabove. It must be understood, however, that various changes, modifications, and alterations in the teachings of the present invention may be contemplated by those skilled in the art without departing from the intended spirit and scope of the present invention. Accordingly, it is intended that the present invention only be limited by the terms of the following claims.

I claim:

1. In a device including existing software programs associated with an existing computer and keyboard, the improvement comprising an apparatus for enabling a user thereof to operate said device through the use of voice commands, keyboard inputs or both, comprising:
   (a) electrical circuit means for installation solely between the existing computer and keyboard;
   (b) a microphone connected to said electrical circuit means for inputting voice commands to said electrical circuit means;
   (c) said circuit means including voice recognition means for recognizing said voice commands;
   (d) said circuit means further including a keyboard switch for adjusting priority between voice commands and keyboard entries;
   (e) said circuit means further including a microprocessor for controlling receipt of voice commands and keyboard entries and for controlling transmission of said commands and entries to said existing computer as if they came from pressing keys of said keyboard, said microprocessor including a read only memory, a random access memory and an A/D converter said read only memory being preprogrammed to take over said existing computer upon activation thereof without programming said existing software of said existing computer prior to commencement of operation by voice command.

2. The invention of claim 1, further including:
   (a) speech synthesis means;
   (b) a D/A converter between said speech synthesis means and said microprocessor;
   (c) preamplifier means connected to said speech synthesis means; and
   (d) speaker means for broadcasting voice command signals and other sounds.

3. The invention of claim 1 further including a cursor control device adapted to be controlled by said voice commands to control a cursor of said existing computer as if said voice commands came from pressing cursor control keys of said keyboard.

4. The system of claim 1, 2 or 3 where the said electrical circuit means draws all its operating power from the existing computer.

5. The invention of claim 1, 2 or 3 where said electrical circuit means has associated therewith controlling means including a training program that uses templates and voice recognition techniques and wherein said templates and voice recognition techniques are programmed for each software package and may be displayed on display means associated with said existing computer.

6. The invention of claim 5, wherein said templates comprise pretrained templates.

7. The invention of claim 6 further including testing means for testing the quality of said templates.

8. The invention of claim 7 further wherein said keyboard includes function keys which may be depressed in predetermined sequence to control said apparatus, said function keys including:
   (a) a first function key used to turn said apparatus on and off and further to set the apparatus in a training mode;
   (b) further function keys which may be operated to select a desired software package; and
   (c) Another function key which may be operated to set the apparatus in a test mode thereof.

9. The invention of claim 8 wherein said keyboard switch may be activated:
   (a) when said first function key is held down for a predetermined time, or
   (b) when a voice input is sensed on said microphone.

10. The system of claim 3 wherein a cursor control switch is provided in order to give priority to the cursor control device, said cursor control device being activated if a cursor command is given into the microphone.

11. The system of claim 1, 2 or 3, where data is stored on a floppy disk storage device associated with said apparatus, said data including:
    (a) a training program for each software program;
    (b) pretrained templates for each software program;
    (c) trained templates for each software program; and
    (d) commands as keypresses for each software program.

12. The system of claim 11 wherein control program in said microprocessor read only memory facilitate:
    (a) the running of programs on the existing computer from said floppy disk;
    (b) the loading of programs from the floppy disk to said microprocessor RAM over the existing computer keyboard via an input/output port thereof; and
    (c) the saving of programs from the RAM to the floppy disk over said computer keyboard input/output port.

13. The system of claim 12 wherein said microprocessor RAM is solely utilized to store template files and command files comprising keypresses.

* * * * *